US009087362B2

(12) United States Patent
Hertenstein

(10) Patent No.: US 9,087,362 B2
(45) Date of Patent: Jul. 21, 2015

(54) TRAFFIC COLLISION INCIDENT VISUALIZATION WITH LOCATION CONTEXT

(75) Inventor: David Hertenstein, Coppell, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 489 days.

(21) Appl. No.: 12/941,348

(22) Filed: Nov. 8, 2010

(65) Prior Publication Data

US 2012/0116819 A1 May 10, 2012

(51) Int. Cl.
*G06Q 40/08* (2012.01)
*G06Q 10/10* (2012.01)

(52) U.S. Cl.
CPC .............. *G06Q 40/08* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 5,504,674 A * | 4/1996 | Chen et al. | 705/4 |
| 6,389,340 B1 * | 5/2002 | Rayner | 701/32.4 |
| 6,405,112 B1 * | 6/2002 | Rayner | 701/33.4 |
| 6,449,540 B1 * | 9/2002 | Rayner | 701/32.3 |
| 8,239,220 B2 * | 8/2012 | Kidd et al. | 705/4 |
| 2002/0035488 A1 * | 3/2002 | Aquila et al. | 705/4 |
| 2002/0082873 A1 * | 6/2002 | Wahlbin et al. | 705/4 |
| 2005/0251427 A1 * | 11/2005 | Dorai et al. | 705/4 |
| 2007/0271105 A1 * | 11/2007 | Gunderson et al. | 705/1 |
| 2008/0052134 A1 | 2/2008 | Nowak et al. | |
| 2008/0071586 A1 * | 3/2008 | Logan | 705/4 |
| 2008/0204834 A1 * | 8/2008 | Hill | 359/9 |
| 2008/0267487 A1 * | 10/2008 | Siri | 382/141 |
| 2009/0138290 A1 * | 5/2009 | Holden | 705/4 |
| 2010/0161491 A1 | 6/2010 | Bauchot et al. | |
| 2010/0174564 A1 | 7/2010 | Stender et al. | |
| 2011/0196707 A1 * | 8/2011 | Danico et al. | 705/4 |
| 2011/0218825 A1 * | 9/2011 | Hertenstein | 705/4 |
| 2011/0238535 A1 * | 9/2011 | Stark | 705/27.1 |

OTHER PUBLICATIONS

Datentechnik, Stephan; PC Crash: A simulation Program for Vehicle Accidents, Version 8.0, Nov. 2006.*

(Continued)

*Primary Examiner* — Robert R Niquette
(74) *Attorney, Agent, or Firm* — Patents on Demand P.A.; Brian K. Buchheit; Scott M. Garrett

(57) ABSTRACT

A mapping data of a location associated with a traffic collision incident can be presented within an automobile incident application interface executing within a computing device. A visualization of the incident can be performed within the interface. The visualization can be a computer generated graphic re-creation of the incident having a starting location and a collision location associated with an object model. The object model can be a graphical representation of a vehicle. A user input can be received during the visualization. The user input can include manipulating the position of an object model presented upon the mapping data. The manipulation can be a translation, rotation, and/or scaling operation. The object model can be associated with visualization data which can link the object model with a heading and/or a track. The appropriate heading and track of the object model can be visually presented within the interface.

20 Claims, 3 Drawing Sheets

(56) References Cited

OTHER PUBLICATIONS

Baecker, Oliver, et al. "Mobile Claims Assistance".

Hampe, Felix J., et al. "A Mobile Accident Report System". 22nd Bled eConference eEnablement: Facilitating an Open, Effective and Representative eSociety., Jun. 14-17, 2009; Bled, Slovenia.

* cited by examiner

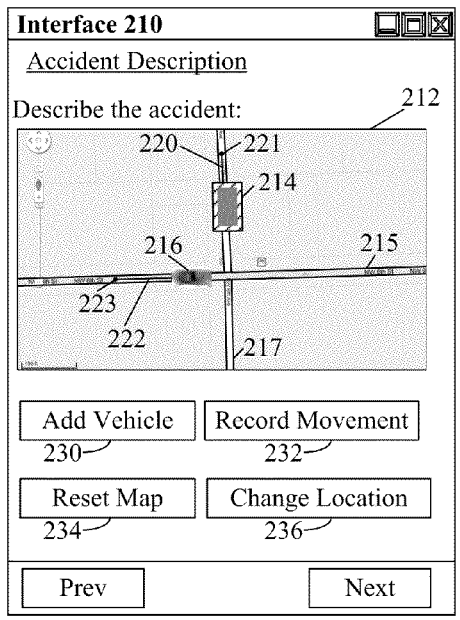
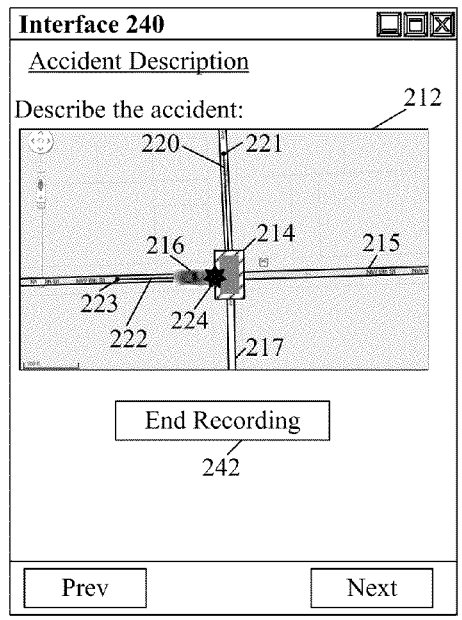

```
function trackCar(e:Event):void
{
    var dx:Number = curCarRec.x - carArray[carNum].lastX;   — 252
    var dy:Number = curCarRec.y - carArray[carNum].lastY;

if(dx > rotLat && dy > rotLat || dx > rotLat && dy < -(rotLat) ||
       dy > rotLat && dx < -(rotLat) || dy < -(rotLat) && dx < -(rotLat))
    {
        var radians:Number = Math.atan2(dy, dx);
        var newRot = ((radians * 180 / Math.PI) - 90);       — 254
        curCarRec.rotation = newRot;
        carArray[carNum].lastX = curCarRec.x;
        carArray[carNum].lastY = curCarRec.y;
    }
    drawingHolder.graphics.lineTo(curCarRec.x, curCarRec.y);  — 256
}
```

FIG. 2

TRAFFIC COLLISION INCIDENT VISUALIZATION WITH LOCATION CONTEXT

BACKGROUND

The present invention relates to the field of computer visualization and, more particularly, to traffic collision incident visualization with location context.

Currently, when a traffic accident occurs, there are many actions which can be performed to resolve the situation. One common action is filing an insurance claim about the accident to an appropriate insurance carrier. An insurance claim typically includes a description of the accident which must be described orally and/or in writing. For example, accident reports usually include a written description of an accident indicating relevant details of the accident.

In many instances, such descriptions lack the context of the surrounding area and/or road layouts present at the site of the accident. Occasionally, road layouts can contribute to accidents which can be extremely relevant to insurance claims (e.g., determining liability). Further, descriptions typically do not allow the user to graphically represent the accident in a way that can be digitally accessed.

In some instances a drawing of the accident can be utilized to aid in describing the accident. The accident can be typically illustrated by an operator of a vehicle. However, often times accurately portrayal surrounding areas and/or road layouts can be difficult to obtain. This can be due to a number of reasons which can range from incomplete memory recall to unfamiliar surroundings. For example, an insurance claim can be submitted several days from the actual accident occurrence which can result in the driver being unclear as to the exact surroundings.

SUMMARY

A mapping data of a location associated with a traffic collision incident can be presented within an automobile incident application interface executing within a computing device. A visualization of the incident can be performed within the interface. The visualization can be a computer generated graphic re-creation of the incident having a starting location and a collision location associated with an object model. The object model can be a graphical representation of a vehicle. A user input can be received during the visualization. The user input can include manipulating the position of an object model presented upon the mapping data. The manipulation can be a translation, rotation, and/or scaling operation. The object model can be associated with visualization data which can link the object model with a heading and/or a track. The appropriate heading and track of the object model can be visually presented within the interface.

BRIEF DESCRIPTION OF THE SEVERAL VIEWS OF THE DRAWINGS

FIG. 2 is a schematic diagram illustrating a set of interfaces and an exemplary algorithm for traffic collision incident visualization with location context in accordance with an embodiment of the inventive arrangements disclosed herein.

DETAILED DESCRIPTION

Figure 1:
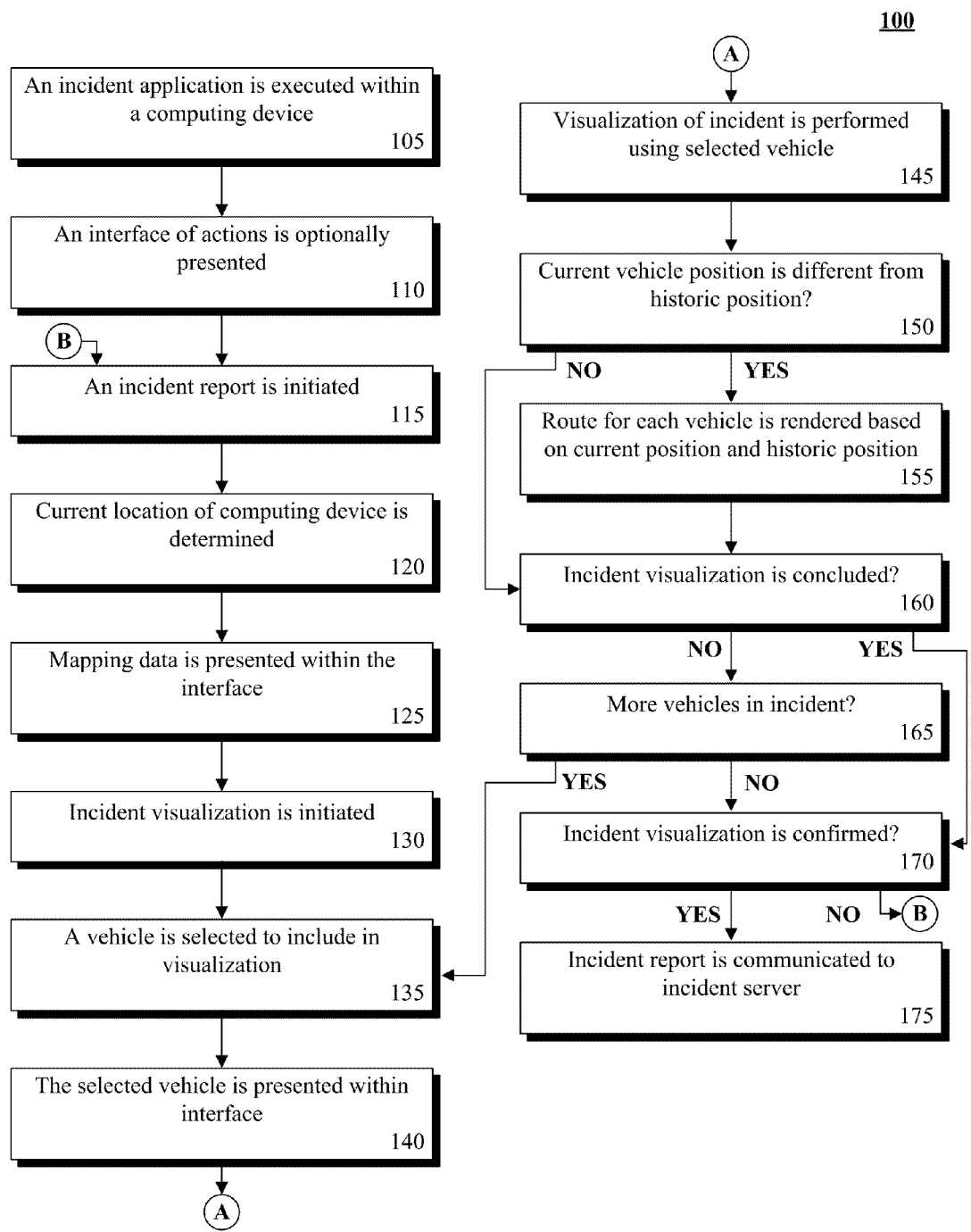
FIG. 1 is a schematic diagram illustrating a method for traffic collision incident visualization with location context in accordance with an embodiment of the inventive arrangements disclosed herein.

The present disclosure is a solution for traffic collision incident visualization with location context. In the solution, a traffic collision incident can be re-created within an interface of an incident application executing within a computing device. The re-creation can be a visualization permitting a simulation to be presented upon a map of the location where the incident occurred. That is, the incident can be re-created with location context enabling specific surrounding elements to be easily represented. In one instance, the visualization can be a real-time visualization constructed from user input. In the embodiment, as a user moves a vehicle (e.g., icon of a vehicle) from a start position, a visualization engine can render the icon with an appropriate route and orientation.

In one embodiment, the incident application can be utilized upon a mobile computing device. In the embodiment, the incident application can permit an incident visualization to be created immediately following an incident. For example, a visualization can be added to an insurance claim which can be filed at the site of the incident.

In another embodiment, the incident application can be executed upon a portable computing device (e.g., laptop). In the embodiment, an insurance agent can assist a policyholder in creating a visualization of an incident at the scene of the incident. For example, an insurance agent can utilize a tablet computing device to create a visualization of an incident based on information provided by a policyholder.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a method 100 for traffic collision incident visualization with location context in accordance with an embodiment of the inventive arrangements disclosed herein. Method 100 can be a portion of a procedure for creating an incident report in response to an incident occurrence. The incident report can be a digital artifact (e.g., document) associated with incident information. Incident information includes, but is not limited to, an insurance entity, a policyholder, a vehicle, and the like. For example, an incident application can be presented within a mobile phone (e.g., smart phone) permitting a policyholder to file an insurance claim with a visualization while at the scene of an incident.

As used herein, an incident can be a traffic collision in which a vehicle collides with another entity. The entity can include, but is not limited to, a vehicle, a pedestrian, an animal, road debris, architectural obstacles, geographical obstacles, and the like. A vehicle can be a device utilized to transport people and/or cargo. The vehicle can include, but is not limited to, automobiles, motorcycles, buses, bicycles, trains, personal transporters, boats, and the like.

In step 105, an incident application can be executed within a computing device. For example, incident application can be a mobile-enable application executing on a mobile phone. In step 110, an interface of actions can be optionally presented. In one instance, the interface can permit relevant actions to be performed including, but not limited to, creating an incident report, calling an insurance agent, photographing the incident, and the like. In step 115, an incident report can be initiated. The incident report can include an incident visualization.

In step 120, the current location of the computing device can be determined. Location determination can be performed utilizing, Global Positioning System (GPS), Assisted GPS (A-GPS), and the like. In one instance, location can be manually selected by a user. For example, a user can enter the street address proximate to the location of an incident occurrence. In step 125, mapping data is presented within the interface. Mapping data can include, but is not limited to, geographical data, road map data, survey map data, and the like.

In step 130, incident visualization can be initiated. Initiation can be automatically and/or manually commenced. In one embodiment, visualization can be automatically started when mapping data is presented within an interface. In another embodiment, a user interface element can enable selective initiation of an incident visualization. For example, a "start" button can be selected to initiate an incident visualization. In step 135, a vehicle can be selected to be included into the visualization. The vehicle selection can be automatically and/or manually selected. In one instance, vehicle selection can be determined from application data (e.g., user profile). For example, the incident application can utilize automotive registration information to determine an appropriate vehicle. In another instance, vehicle selection can be performed through a series of selection steps. For example, a user can specify the make, model, and color of a vehicle.

In step 140, the selected vehicle can be presented within the interface. The selected vehicle can be presented as a graphical object model such as a graphical icon. In one embodiment, graphical icon customization can be optionally performed. For instance, the graphical icon of the vehicle can be customized to various colors, sizes (e.g., enlargement/reduction), and the like. In step 145, visualization of an incident can be performed using a selected vehicle. Visualization can be initiated through one or more triggers including, but not limited to, user input, programmatic triggers, and the like. User input can include vehicle selection, vehicle manipulation (e.g. movement), and the like. In one instance, visualization can begin when a user drags the vehicle across a touchscreen enabled interface. In one embodiment, multi-touch interfaces can support multiple selection and manipulation of vehicle. For example, using two fingers a user can drag two vehicles into a collision path to create an incident visualization of an occurred accident.

In step 150, if the current vehicle position is different from a historic position, the method can continue to step 155, else proceed to step 160. In step 155, the route for each selected vehicle can be rendered based on the current and historic position change. For example, based on position deltas the orientation and route of a vehicle can be rendered as an overlay on the mapping data within the interface. In step 160, if the incident visualization is concluded, the method can proceed to step 170, else continue to step 165. In step 165, if there are more vehicles associated with the incident, the method can return to step 135, else continue to step 170. In step 170, if the incident visualization is confirmed, the method can continue to step 175, else return to step 115. In step 175, the incident report can be communicated to an incident server. The report can be communicated utilizing traditional and/or proprietary mechanisms.

Drawings presented herein are for illustrative purposes only and should not be construed to limit the invention in any regard. In one embodiment, incident application can include a software wizard able to guide a user through creating a visualization of an incident. It should be appreciated that a user of the incident application can include policyholders, insurance agents, and the like.

FIG. 2 is a schematic diagram illustrating a set of interfaces 210, 240 and a sample algorithm 250 for traffic collision incident visualization with location context in accordance with an embodiment of the inventive arrangements disclosed herein. Interfaces 210, 240 and algorithm 250 can be present in the context of method 100 and/or system 300. For example, interfaces 210, 240 can assist in automated re-creation of an incident which can be associated with an incident report submitted to an insurance agency.

In interface 210, an incident visualization can be configured through selection and position of each object model 214, 216 (e.g., vehicle) associated with the incident. In interface 240, manipulation of each model 214, 216 can be recorded to enable a re-creation to be generated. In one embodiment, the visualization can be created in real-time and presented within interface 210, 240. It should be appreciated that interface 240 can appear in succession of interface 210. For example, interface 240 can be presented during user input capture of a visualization re-creation.

In one instance, interfaces 210, 240 can be a set of screens (e.g., wizard) of an incident reporting application provided an insurance agency. In the instance, insurance agency specific instructions (e.g., policy requirements) can be presented during the visualization creation process.

In interface 210, an incident visualization can be created utilizing interface elements 212-236. Interface 210 can include, but is not limited to, map 212, object model 214, 216 (e.g., graphical vehicle representations), interface elements 230-236 (e.g., push buttons), and the like. In one embodiment, object model 214, 216 can be graphical icons having approximate appearance to each vehicle associated with an incident. For example, model 214 can be an icon of a sports utility vehicle (SUV) and model 216 can be an icon of a sedan. Interface elements 230-236, 242 can enable manipulation of visualization and visualization elements.

In one instance, interface 210, 240 can respond to input gestures including, but not limited to, zoom, drag and drop, rotate, and the like. In the instance, model 214, 216 can be manipulated by interacting directly with the model (e.g., via touch). In another instance, interface 210, 240 can utilize, but is not limited to, keyboard input, pointer input, and the like.

In map 212, relevant roadway features (e.g., road layout) can be presented. Map 212 can include, but is not limited to, surface roads, highways, pavements, medians, guard rails, crosswalks, bicycle lanes, bridges, tunnels, geographical elements (e.g., lakes), environmental objects. Environmental objects can include, but are not limited to, pedestrians, traffic cones, bollards, Fitch barriers, road debris, gates, fences, fire hydrants, utility objects (e.g., telephone poles), and the like. Map 212 can be associated with a geographic coordinate system, Cartesian coordinate system, grid, and the like. In one embodiment, map 212 can be associated with an internal coordinate system enabling waypointing, routing, and the like. It should be appreciated map 212 can be obtained from one or more sources including, but not limited to, GOOGLE MAPS, MAPQUEST, and the like.

In one instance, map 212 can be a two-dimensional geometrically accurate representation of a three-dimensional space. In another instance, map 212 can be a three-dimensional geometrically accurate representation of a three-dimensional space. In one embodiment, map 212 can be a road map of an area associated with an incident. In the embodiment, map 212 can present road names, road layout, and the like. In another embodiment, map 212 can be a satellite map of an area associated with an incident.

Object model 214, 216 can be presented within map 212 upon selection. In one instance, model 214, 216 can be distinguished from each other. In the instance, each model 214, 216 can be associated with visual and/or aural properties including, but not limited to, color, size, shape, sound effect, shading, borders, and the like. For example, the vehicle of a policyholder utilizing interface 210, 240 can be surrounded by a border having diagonal lines. In one embodiment, the object model of a vehicle owned by a user (e.g., policyholder) interacting with the re-creation can be distinguished (e.g., colored border) from other vehicles. In one embodiment, positioning of object model 214, 216 can be aided by drawing features including, but not limited to, object snap, grid overlays, and the like. For example, as a user moves a vehicle 214 along road 215, the vehicle path can horizontally snap to road 215 lines within map 212.

Waypoint 221, 223 can be an point of interest associated with each model 214, 216 within a visualization. In one embodiment, waypoint 221, 223 can indicate an initial starting location for each model 214, 216. In one instance, multiple waypoints can be established for each model 214, 216. In the instance, waypoints can be used to indicate directional changes (e.g., change in orientation), velocity adjustments (e.g., complete stop), and the like.

Route 220, 222 can be a path of a model 214, 216 established from waypoint 221, 223 to a user determined location. Route 220, 222 can be a line segment which can be linear, curved, and the like. Route 220, 222 can be visually represented as a continuous line, dashed line, dotted line, and the like. For example, route 220, 222 can be presented as a line trailing object 214, 216 indicating a direction of travel. Route 220, 222 can be associated with graphical properties including, but not limited to, color, shapes, and the like. Route 220, 222 can be created when manipulation of object model 214, 216 occurs. In one instance, route 220, 222 can be a series of visually connected waypoints. In one embodiment, route 220, 222 can be generated using algorithm 250. In the embodiment, algorithm 250 can determine an object orientation (e.g., direction of travel) and/or a route from a selected waypoint. In one instance, route 220, 222 can be rendered having a parallel alignment to a road. In the instance, route 220, 222 can be rendered within roadway lines 215, 217 of map 212 indicating the path taken by object 214, 216.

Element 230 can permit the inclusion of one or more object models (e.g., vehicles) to be visualized within the re-creation. When interaction with element 230 occurs, an appropriate object model can be presented within map 212. In one instance, the object model can be presented in a default location (e.g., top left-hand corner) when element 230 is selected. In another instance, user input can be required to place the object model within a location on map 212. In one embodiment, element 230 can present a user interface permitting selection and/or management of object models. In the embodiment, a user interface with object model management options can be presented. For example, a pop-up dialog can permit addition, editing, and deletion of object models within map 212.

Element 232 can enable user input to be captured to create an incident visualization. Selection of element 232 can trigger capturing of vehicle 214, 216 motion as determined by user input. In one instance, interaction with element 232 can permit movement of object models within map 212. That is, prior to interaction with element 232 object model positions can be locked rendering the models immutable (e.g., immovable). In one instance, selection of element 232 can present interface 240. In the instance, interface element 242 can be utilized to terminate input capture.

Element 234 can be a user input artifact allowing the visualization to be restarted from a restore point. The restore point can be application defined, user defined (e.g., user configuration settings), and the like. In one instance, the restore point can include the first object model position and state. For example, vehicle 214 and vehicle states (e.g., route 220, 223, waypoint 221, 223) excluding the first vehicle (e.g., vehicle 216) can be removed.

Element 236 can be a user input artifact enabling location selection of an incident occurrence. Element 236 can permit the location map 212 to be modified rapidly which can result in replacement of map 212 with a different map. In one instance, interaction with element 236 can present a location selection interface. For example, element 236 can return a user to a location selection portion of an incident application.

In one embodiment, interface 210, 240 can be present playback controls associated with a completed visualization. In the embodiment, playback controls can include, but not limited to, play, record, stop, pause, rewind, fastforward, and the like. For example, upon completion of a visualization, a user can playback the visualization to ensure accuracy of the re-creation.

Interface 240 can be an optional interface which can be presented during a visualization re-creation process. Interface 240 can lack elements 230-236 and present interface element 242. When a visualization is completed, element 242 can permit termination of the visualization. For example, when a user illustrates crash 224 within map 212, the user can select button 242 to end user input capture. In one instance, interface elements 230-236 can be presented within interface 240 and element 242 can be absent. In another instance, interface 210 can be presented upon selection of element 242. In yet another instance, a different interface can be presented enabling user submission of the visualization to an insurance entity.

In one embodiment, a collision can be automatically detected (e.g., collision detection algorithm) and a visual graphic can be presented. For example, a collision graphic (e.g., star 224) can be presented when two or more models are detected to be in collision. In another embodiment, a collision graphic can be manually selected to indicate proximate location of damage to a vehicle.

Algorithm 250 can be an exemplary computer functionality for rendering an object model orientation and/or route. Algorithm 250 can include, but is not limited to, code blocks 252, 254, 256, and the like. Algorithm 250 can receive user input which can be utilized to determine an object model position. In one embodiment, algorithm 250 can be a portion of a line drawing algorithm, an application programming interface (API), an application functionality, and the like. In one instance, algorithm 250 can be a portion of a Web-enabled service.

In block 252, a change in position of model 214, 216 can be determined utilizing position data. Position data can include, but is not limited to, historic position, current position, and the like. In one instance, block 252 can calculate a change in an x and y position. In the instance, a current x and y position is subtracted from a historic x and y position.

In block 254, the orientation of a model can be programmatically determined based on one or more threshold values. The block 254 can calculate a degree value associated with the rotation of an object model. In one instance, if the x (e.g., dx) and y (e.g., dy) deltas are greater than a predefined value (e.g., rotLat), the orientation of the model can be calculated. In the instance, the predefined value can be a rotational value, a distance value, and the like.

In block 256, the route of a model can be displayed within an interface. In one instance, a circle can be presented at a start location which can be connected to a line following a user input. For example, as a user drags an object model, a line can be drawn between a starting point and a current position of the object model.

It should be appreciated that algorithm 250 can execute in real-time to produce dynamic and user interactive orientation, routing, and presentation functionality. That is, as a user interacts with an object model, algorithm 250 can capture user input and render an appropriate orientation and/or route in real-time or near real-time.

Drawings presented herein are for illustrative purposes only and should not be construed to limit the invention in any regard. It should be appreciated that interfaces 210, 240 can include additional elements including, but not limited to, images, text, user interface elements, and the like. Interface elements 230-236, 242 can include, but is not limited to, push buttons, checkboxes, radio dialogs, and the like. Interface 210, 240 functionality can be accessible via a drop-down menu, context menu, and the like. It should be appreciated that the disclosure is not limited to two vehicles and can include an arbitrary quantity of vehicles.

In one embodiment, additional object models can be presented and manipulated within interface 210, 240. Additional object models can include, but is not limited to, pedestrians, signage, debris, and the like.

Figure 3:
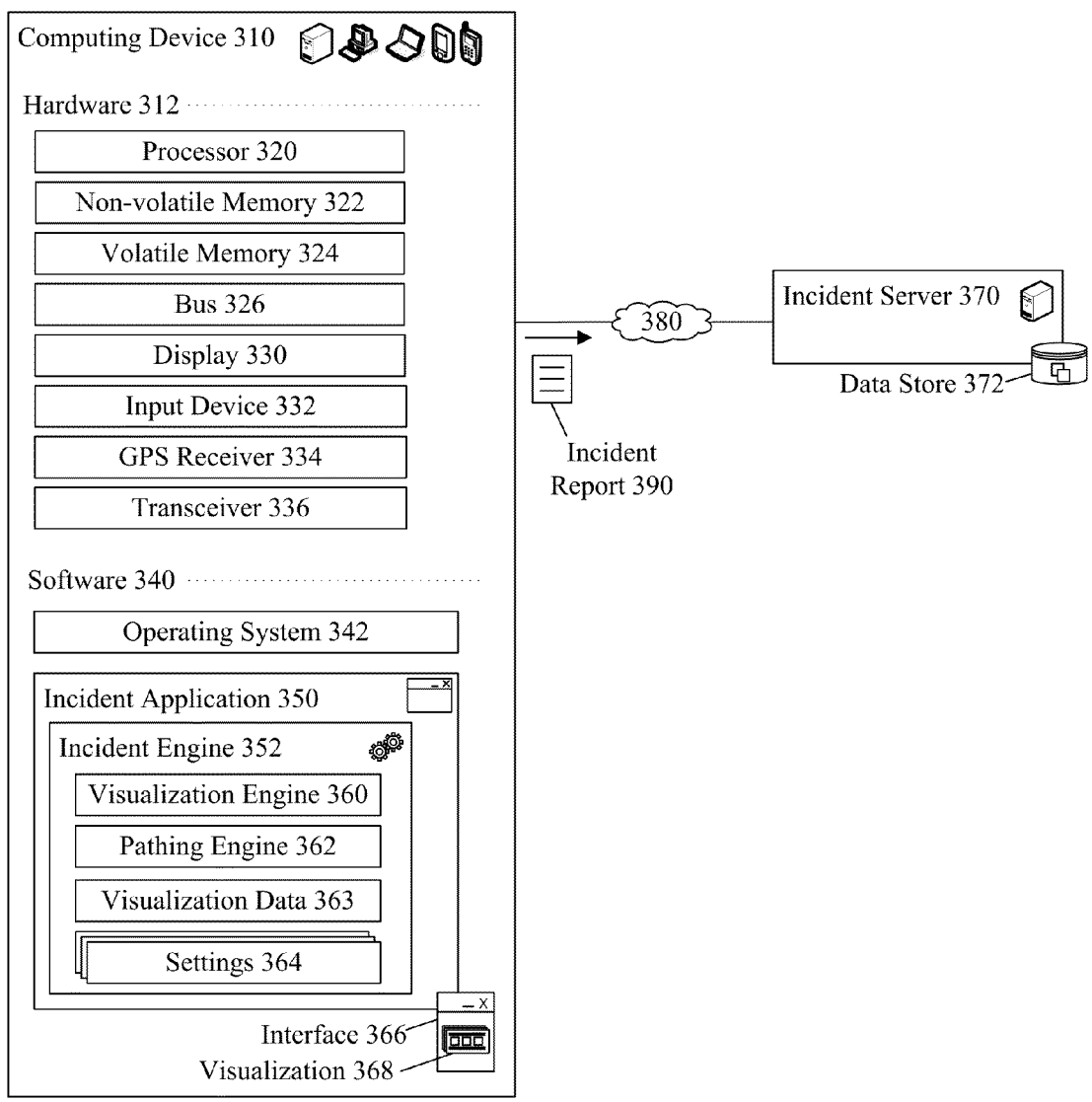
FIG. 3 is a schematic diagram illustrating a system for traffic collision incident visualization with location context in accordance with an embodiment of the inventive arrangements disclosed herein.

FIG. 3 is a schematic diagram illustrating a system 300 for traffic collision incident visualization with location context in accordance with an embodiment of the inventive arrangements disclosed herein. System 300 can be present in the context of method 100, interface 210, 240, and algorithm 250. System 300 can permit an incident visualization to be generated within a computing device. In system 300, a computing device 310 can be communicatively linked to an incident server 370 via network 380. Engine 352 can be utilized to re-create an incident based on user input. In one configuration of system 300, visualization data 363 and/or visualization 368 can be associated with an incident report 390. It should be appreciated that the system 300 is not limited in this regard and incident report 390 can be an optional component.

Incident report 390 can be a user generated digital artifact associated with an incident occurrence. Report can include insurance information including, but not limited to, Incident report 390 can be a document, a series of documents, an archive, and the like. In one instance, incident report 390 can include an incident report (e.g., text description), photographs, visualization data 363, visualization 368, and the like. In one embodiment, report 390 can be an ADOBE PORTABLE DOCUMENT FORMAT (PDF) document.

Incident application 350 can be a software application permitting incident visualization to be created. Application 350 can include, but is not limited to, incident engine 352, interface 366, and the like. Application 350 can be a mobile application, Web-based application, desktop application, and the like. In one instance, incident application 350 can be a portion of an incident reporting application permitting creation of an incident report 390. In the instance, visualization data 363 and/or visualization 368 can be associated with an incident report 390 which can be conveyed to an incident server 370.

Incident engine 352 can be a software component permitting an incident visualization re-creation process to occur. Engine 352 can include, but is not limited to, visualization engine 360, pathing engine 362, visualization data 363, settings 364. In one instance, engine 352 can be a component of server 370 enabling visualization 368 to be created remotely. In the instance, data 363 can be communicated to server 370 which can generate visualization 368 and convey the visualization 368 to interface 366. Engine 342 can be a stand-alone component, a component of a distributed computing environment, a network computing environment, a cloud computing environment, and the like.

Visualization engine 360 can be a software entity permitting generation and/or management of visualization 368. Engine 360 can render visualization 368 within interface 366. Engine 360 can manipulate two-dimensional geometric models, text, digital images, and the like. Engine 360 can support object manipulation including, but not limited to, translation, rotation, scaling, and the like. Engine 360 can provide playback and/or management functionality associated with visualization 368.

Pathing engine 362 can be utilized to determine orientation and/or route of an object model within visualization 368. Engine 362 can respond to user input based on one or more threshold values. In one instance, threshold values can be configured to determine forward movement, backward movement, rotation, and the like. For example, when a user drags an object model more than ten pixels, engine 362 can calculate an appropriate route and orientation for the object model. Engine 362 can utilize one or more control points to determine orientation. Control points can include, but is not limited to, a waypoint, a magnetic pole, and the like. Engine 362 can utilize traditional and/or proprietary algorithms (e.g., algorithm 250) to perform orientation and/or route determination. In one instance, engine 362 can be a line drawing algorithm including, but not limited to, Digital Differential Analyzer, Bresenham line algorithm, and the like.

Visualization data 363 can be one or more datasets associated with a visualization 368. Data 363 can be a digital artifact (e.g., document) including, but not limited to, visualization information, mapping data, insurance information, personal information, vehicle registration information, and the like. Visualization information can include, but is not limited to, waypoints, routes, timing data. Mapping data can include, but is not limited to, latitude coordinates, longitude coordinates, and the like. Insurance information can include, but is not limited to, policy identifier, insurance carrier identifier, insurance, claim type, and the like. Personal information can include, but is not limited to, policyholder name, mailing address, contact information, and the like. Data 363 can conform to, but is not limited to, Extensible Markup Language, GPS Exchange Format (GPX), and the like. In one instance, data 363 can be associated with security mechanisms. For example, data 363 can be automatically encrypted prior to transmission via email.

Settings 364 can be one or more configuration options for controlling the behavior of engine 352. Settings 364 can include, but is not limited to, user established settings, heuristically determined settings, and the like. Settings 364 can control mapping data source, mapping data presentation, visualization data formats, visualization rendering, communication settings, and the like. Communication settings can include, but is not limited to, transmission format, communication medium, transmission protocols, security settings, and the like. Communication medium can include, but is not limited to, electronic mail, Multimedia Messaging Service, and the like.

Visualization 368 can be one or more graphical formats including, but not limited to, raster graphics, vector graphics, and the like. In one embodiment, visualization 368 can include sophisticated graphic techniques (e.g., photo-realistic graphics) including, but not limited to, ray tracing, shading, texture mapping, anti-aliasing, and the like. Visualization 368 can include visual effects including, but not limited to, two-dimensional effects (e.g., still image graphics), three-dimensional graphics (e.g., fire animation), and the like. Visualization format can conform to one or more traditional and/or proprietary formats. Formats can include, but is not limited to, Motion Picture Experts Group 4 (MPEG-4), Motion Joint Photographic Experts Group (M-JPEG), Audio/Video Interleave (AVI), and the like.

Interface 366 can be a hardware/software component for presenting visualization 368. Interface 366 can be associated with incident application 350, operating system 342, input device 332, display 330, and the like. Interface 366 can be a desktop computing interface, Web-based interface, mobile application interface, and the like. In one instance, interface 366 can be a Web browser capable of presenting visualization 368 and/or report 390.

Computing device 310 can be a hardware/software entity able to execute an incident application 350. Device 310 can include, but is not limited to, hardware 312, software 340, and the like. Device 310 can be, but is not limited to, desktop computer, laptop computer, mobile phone, portable digital assistant (PDA), portable media player, tablet computing device, and the like. Device 310 can be communicatively linked to additional components including, but not limited to, location service components, presence service components, automotive global positioning system (GPS) devices, and the like.

Hardware 312 can be electronic physical components for executing software 340 and constituent components. Hardware 312 can include, but is not limited to, processor 320, non-volatile memory 322, volatile memory 324, bus 326, display 330, input device 332, GPS receiver 334, transceiver 336, and the like. Hardware 312 components 320-336 can be distributed among one or more devices. For example, GPS receiver 334 can be a portion of an automotive GPS device.

Processor 320 can be a portion of a computing system able to execute instructions of a computing program. Processor 320 can include, but is not limited to, central processing unit (CPU), microprocessor, graphics processing unit (GPU), physics processing unit (PPU), and the like. In one embodiment, processor 320 can be a graphics processing unit able to create visualization 368 in real-time. In the embodiment, processor 320 can enable playback and management of visualization 368.

Non-volatile memory 322 can be a static storage medium for persisting data 363 and/or visualization 368. Memory 322 can include, but is not limited to, flash memory, hard disk drive, and the like. In one instance, memory 322 can be a removable memory component enabling visualization 368 to be easily exported and/or transferred. In the embodiment, memory 322 can store visualization 368 in one or more proprietary and/or traditional media formats.

Volatile memory 324 can be a dynamic storage medium for temporarily persisting data 363 and/or visualization 368. Memory 324 can include, but is not limited to, random access memory (RAM), dynamic RAM (DRAM), static RAM (SRAM), and the like. In one embodiment, memory 324 can temporarily store data 363 during user input capture of a visualization re-creation.

Bus 326 can be an interconnected subsystem for communicatively linking components 320-336. Bus 326 can be serial and/or parallel permitting high speed communications to and from components 320-336. In one instance, bus 326 can communicate user input from display 330 and/or device 332 to components 320-326, 334, 336.

Display 330 can be an electronic visual display permitting presentation of visualization data 363, visualization 368, and/or report 390. Display 330 can be one or more proprietary and/or traditional technologies, including, but not limited to, Liquid Crystal Display (LCD), Organic Light Emitting Diode (OLED), Active Matrix OLED (AMOLED), and the like. Display 330 can include proprietary and/or traditional touch sensitive capabilities. Proprietary and/or traditional touch sensitive capabilities can include, but is not limited to, capacitive sensing, resistive sensing, and the like.

Input device 332 can be a human interface device capable of receiving user input for a visualization 368. Input device 332 can be, but is not limited to, alphanumeric keyboard, keypad, mouse, omni-directional ball, joystick, stylus, and the like. In one instance, input device 332 can be a component of display 330.

GPS receiver 334 can be a device able to receive GPS data based on an automatically determined the location or a user specified location. GPS data can include, but is not limited to, mapping data, GPS coordinate data, and the like. In one instance, GPS receiver 334 can be an external device communicatively linked to device 310.

Transceiver 336 can be a component permitting communication between one or more external entities. In one instance, transceiver 336 can be a Radio Frequency (RF) transceiver. Transceiver 336 can permit communication of incident report 390 to incident server 370.

Software 340 can be a set of components for enabling interaction with interface 366, visualization 368, and/or incident report 390. Software 340 can include, but is not limited to, operating system 342, incident application 350.

Operating system 350 can be a software entity permitting execution of incident application 350. Operating system 350 can include, but is not limited to, non-real-time operating systems, real-time operating systems, and the like.

Network 380 can be one or more computing network components permitting direct and/or indirect communication between computing device 310 and incident server 370. Network 380 can include wired networking components, wireless networking components, and any combination thereof. Network 380 can include public networks, private networks, virtual private networks, and the like. In one instance, network 380 can be the Internet.

Drawings presented herein are for illustrative purposes only and should not be construed to limit the invention in any regard. In one instance, incident engine 352 can be a component of a remote system (e.g., incident server 370). In the instance, visualization data 363 can be communicated to a remote system which can render the data into a visualization 368. In one embodiment, mapping data utilized by engine 352 can be obtained from server 370. In the embodiment, mapping data within data store 372 can be selectively communicated to device 310 when necessary. It should be noted that server 370 can be an optional component of system 300.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for visualizing a traffic collision incident comprising:
   presenting within an interface a mapping data of a location associated with an incident, wherein the incident is a traffic collision, wherein the interface is associated with an automobile incident application, wherein the application is executing within a computing device;
   receiving, via the interface, a user input associated with the incident;
   performing a visualization of the incident within the interface, using the user input, wherein the visualization is a computer generated graphic re-creation of the incident, wherein the visualization indicates at least a starting location and a collision location of at least one object model, wherein the object model is a graphical representation of a vehicle;

receiving an additional user input during the visualization, wherein the additional user input is manipulating the position of at least one object model presented upon the mapping data, wherein the manipulation is at least one of a translation, rotation, and scaling, wherein the object model is associated with visualization data, wherein the visualization data links the object model with at least one of a heading and a track of the object model; and responsive to the receiving, visually presenting an appropriate heading and track of the at least one object model within the interface.

2. The method of claim 1, further comprising:
programmatically calculating the orientation of the object model in response to the receiving, wherein the calculating is associated with a first position of the object model and a second position of the object model, wherein the first position is a current position and the second position is a historic position.

3. The method of claim 1, wherein the visualization data comprises of at least one of a Global Positioning System (GPS) data, a timing information, a personal information, an insurance carrier information, and a policyholder information.

4. The method of claim 1, wherein the object model is automatically determined from a user profile.

5. The method of claim 1, further comprising:
visually presenting a first starting location and first path associated with a first object model and a second starting location and second path associated with a second object model, wherein the location and path of the first and second object model is visually distinct from each other, wherein the first and second starting location is a waypoint, wherein the first and second path is a route associated with the first and second object model.

6. The method of claim 1, wherein the track corresponds to at least one alignment of at least one roadway associated with the mapping data.

7. The method of claim 1, wherein at least one of the visualization and visualization data is associated with an incident report, wherein the incident report is a portion of an insurance claim.

8. The method of claim 1, wherein the visualization data is conveyed to a remote entity.

9. The method of claim 1, wherein the incident application is associated with an insurance entity.

10. A system for visualizing a traffic collision incident comprising:
a visualization engine able to graphically re-create a traffic collision incident upon an interface utilizing mapping data and a user input associated with the traffic collision incident, wherein the interface is associated with an incident application, wherein the incident application executing within a computing device;
a routing engine configured to render at least one object model within the interface, wherein the at least one object model is a graphical representation of a vehicle, wherein the at least one object model is associated with a heading and a track; and
a visualization dataset able to link the at least one object model with at least one of the traffic collision incident and an incident location, wherein the incident location I at least one geographic location.

11. The system of claim 10, wherein the routing engine is associated with a navigation algorithm able to programmatically determine the orientation and position of the object model in real-time.

12. The system of claim 10, wherein the incident application is associated with an insurance entity.

13. The system of claim 10, wherein the visualization dataset is associated with an incident report, wherein the incident report is a portion of an insurance claim.

14. The system of claim 10, wherein the visualization dataset is communicated to an incident server, wherein the visualization data set conforms to an Extensible Markup Language (XML) convention.

15. The system of claim 10, wherein the at least one object model is an iconic representation of a vehicle owned by an insured entity associated with the incident, wherein the iconic representation is automatically determined utilizing a user profile associated with the insured entity.

16. An apparatus including an interface for traffic incident visualization comprising:
a tangible memory storing at least one computer program product;
a processor operable to execute the computer program product to cause the interface window to be displayed by the display hardware; and
the computer program product when executed by the processor being operable to present within an interface a mapping data of a location associated with an incident, wherein the incident is a traffic collision, wherein the interface is associated with an automobile incident application, wherein the application is executing within a computing device;
the computer program product when executed by the processor being operable to receive, via the interface, a user input associated with the incident;
the computer program product when executed by the processor being operable to perform a visualization of the incident within the interface using the user input, wherein the visualization is a computer generated graphic re-creation of the incident, wherein the visualization indicates at least a starting location and a collision location of at least one object model, wherein the object model is a graphical representation of a vehicle;
the computer program product when executed by the processor being operable to receive an additional user input during the visualization, wherein the additional user input is manipulating the position of at least one object model presented upon the mapping data, wherein the manipulation is at least one of a translation, rotation, and scaling, wherein the object model is associated with visualization data, wherein the visualization data links the object model with at least one of a heading and a track of the object model;
the computer program product when executed by the processor being operable to respond to the receiving, visually presenting an appropriate heading and track of the at least one object model within the interface.

17. The apparatus of claim 16, wherein the incident application is associated with an insurance carrier, wherein the incident application is able to convey the visualization data to a remote entity, wherein the visualization data is associated with an insurance claim.

18. The apparatus of claim 16, wherein the visualization data conforms to a Global Positioning System Exchange Format (GPX) convention.

19. The apparatus of claim 16, wherein within the interface, a first starting location and first path associated with a first object model and a second starting location and second path associated with a second object model is visually presented, wherein the location and path of the first and second object model is visually distinct from each other, wherein the first and second starting location is a waypoint, wherein the first and second path is a route associated with the first and second object model.

20. The apparatus of claim 16, wherein the visualization data comprises of at least one of a GPS data, a timing information, a personal information, an insurance carrier information, and a policyholder information.

\* \* \* \* \*